United States Patent
Toon

(10) Patent No.: US 10,167,781 B2
(45) Date of Patent: Jan. 1, 2019

(54) IGNITER ASSEMBLY

(71) Applicant: ROLLS-ROYCE PLC, London (GB)

(72) Inventor: Ian James Toon, Leicester (GB)

(73) Assignee: ROLLS-ROYCE plc, London (GB)

( * ) Notice: Subject to any disclaimer, the term of this patent is extended or adjusted under 35 U.S.C. 154(b) by 469 days.

(21) Appl. No.: 14/871,048

(22) Filed: Sep. 30, 2015

(65) Prior Publication Data
US 2016/0115873 A1 Apr. 28, 2016

(30) Foreign Application Priority Data
Oct. 27, 2014 (GB) .................................. 1419053.2

(51) Int. Cl.
F02C 7/266 (2006.01)
(52) U.S. Cl.
CPC ............. F02C 7/266 (2013.01); Y02T 50/671 (2013.01)
(58) Field of Classification Search
CPC ...................................................... F02C 7/266
See application file for complete search history.

(56) References Cited

U.S. PATENT DOCUMENTS

| 9,587,831 B2* | 3/2017 | Jause | .......................... | F02C 7/20 |
| 9,625,151 B2* | 4/2017 | Jause | .......................... | F23R 3/06 |
| 2007/0068166 A1 | 3/2007 | Gautier et al. | | |
| 2014/0144148 A1 | 5/2014 | Jause et al. | | |
| 2014/0174091 A1* | 6/2014 | Ivory | ...................... | F23R 3/002 60/752 |

FOREIGN PATENT DOCUMENTS

| EP | 2 871 419 A1 | 5/2015 |
| WO | 2014/051871 A1 | 4/2014 |

OTHER PUBLICATIONS

Nov. 12, 2015 Search Report issued in British Patent Application No. GB1517165.5.
Apr. 15, 2015 Search Report issued in British Patent Application No. 1419053.2.

* cited by examiner

Primary Examiner — Arun Goyal
(74) Attorney, Agent, or Firm — Oliff PLC

(57) ABSTRACT

An igniter assembly for a combustion system of a gas turbine engine is provided. The igniter assembly includes an igniter plug having a tip which, in use, is located at an aperture in a wall of a flame-tube of the combustion system such that the tip can provide an electrical discharge to ignite an air-fuel mixture within the flame-tube. The igniter assembly further includes a substantially annular igniter boss which locates on the wall of the flame-tube at the aperture to encircle the tip. The igniter boss has a slot formed therein at one side of the tip. An entrance of the slot receives air from outside the flame-tube and an exit of the slot delivers the air as a sheet-shaped flow over the tip. The slot is tapered such that the thickness of the slot narrows from its entrance to its exit.

13 Claims, 4 Drawing Sheets

IGNITER ASSEMBLY

TECHNICAL FIELD

The present invention relates to an igniter assembly for a combustion system of a gas turbine engine.

BACKGROUND OF THE INVENTION AND PRIOR ART

FIG. 1 shows schematically a cross-section through a multiple flame-tube combustor of a gas turbine engine. A number of flame-tubes 200 (only one shown in FIG. 1) are spaced circumferentially around the combustor, each flame-tube having a radial airspray burner 202. The flame-tubes are without interconnectors, and thus each has two igniter plugs 204 (only one shown in FIG. 1) and a locating pin fuel atomiser 206 used for starting only. Air admission port tubes 208 are welded to the barrel of the flame-tube. The flame-tubes 200 have thermal barrier coatings (TBCs) on their inner (hot) sides. The flame-tubes are single-skinned and cooled by cooling air films produced by angled effusion holes.

A double-walled casing system surrounds the flame-tubes. The outer 210 and inner 212 walls of the system form between them an outer volume 211 which gathers compressed air received from the high-pressure compressor of the engine for onward delivery to an exhaust gas recuperator. The inner wall 212 and the flame-tubes 200 form between them an inner volume 213 which receives the returning compressed air from the recuperator for delivery into the flame-tubes.

Each igniter plug 204 enters its flame-tube 200 through an aperture in the wall of the tube, with a substantially annular igniter boss 214 welded to the tube at the aperture to encircle the tip of the plug. The tip is thereby located such that it can provide an electrical discharge to ignite an air-fuel mixture within the flame-tube 200, the boss providing a mounting position for a seal for the igniter plug. The boss can also provide air holes which supply scrubbing air jets to the tip.

For example, as shown schematically in FIG. 2, each igniter boss 214 has an inner surface 215 which is flush with the hot side of the wall of the flame-tube 200. The boss also has a number of 3.0 mm diameter holes 216 at an angle of about 17.5° to the face 217 of the igniter tip and the hot side of the wall. Air from the inner volume 213 is directed by the holes 216 into air jets 218, the trajectory of which just misses the end of the bore of the boss 214 on the opposite side to the exits of the holes. The low angle of the air jets results in them scrubbing the tip of the igniter, such that they remove large fuel droplets that can reach the tip during ignition. The low angle air jets also combine with an upstream cooling air film 220 created by circumferential angled effusion holes to create an enhanced downstream cooling air film 222 across the hot side of the wall of the flame-tube.

When the combustor is used with corrosive fuels, such as marine diesel fuels, the inner surface 215 of the igniter boss 214 can quickly become corroded.

One option is to coat the inner surface 215 with a suitable resistant coating. However, this can increase costs as igniter bosses are in any event susceptible to wear due to the proximity of the igniter electrical discharge and thus in general have to be replaceable items.

Another option, shown schematically in FIG. 3, is to retract the igniter boss 214 and the igniter plug 204 slightly from the flame-tube 200 such that the wall of the flame-tube can be extended to cover over the inner surface 215 of the boss. This can protect the boss from corrosive fuels. However, the air jets 218 from the holes 216 then impact on the edge of the flame-tube wall defining the aperture rather than combining with the cooling air film 220 to create the enhanced downstream cooling air film 222. As a result, hot spots can be formed downstream of the boss, resulting in TBC loss, metal cracking and unacceptable combustor life. Further, the disturbed airflow around the igniter tip 217 can inhibit the drying of the tip face 217 and increase the amount of fuel droplets being transported into the bore of the boss 214. These fuel droplets can coke and cause short circuit malfunctions within the igniter assembly, resulting in an unacceptable igniter plug life and compromising start reliability.

If the holes 216 are adjusted so that the angle of the air jets 218 is increased, the air jets can be prevented from impacting on the edge of the flame-tube wall. However, the increased air jet angle causes less effective scrubbing of the igniter tip face 217. In addition, the increased angle hinders the air jets from combing with the cooling air film 220.

An object of the present invention is to provide an igniter assembly which addresses such problems.

SUMMARY OF THE INVENTION

Accordingly, in a first aspect, the present invention provides an igniter assembly for a combustion system of a gas turbine engine, the igniter assembly including:
 an igniter plug having a tip which, in use, is located at an aperture in a wall of a flame-tube of the combustion system such that the tip can provide an electrical discharge to ignite an air-fuel mixture within the flame-tube; and
 a substantially annular igniter boss which locates on the wall of the flame-tube at the aperture to encircle the tip;
 wherein the igniter boss has a slot formed therein at one side of the tip, an entrance of the slot receiving air from outside the flame-tube and an exit of the slot delivering the air as a sheet-shaped flow over the tip, the slot being tapered such that the thickness of the slot narrows from its entrance to its exit.

Advantageously, the sheet-shaped flow can provide effective tip scrubbing. The flow through the slot and the configuration of the boss which provides the slot can also help to prevent flame-tube TBC delamination.

In a second aspect, the present invention provides a combustion system of a gas turbine engine, the combustion system having one or more flame-tubes, wherein each flame-tube has one or more igniter assemblies according to the first aspect. The insides of the walls of the flame-tubes may have thermal barrier coatings.

In a third aspect, the present invention provides a gas turbine engine having a combustion system according to the second aspect.

Optional features of the invention will now be set out. These are applicable singly or in any combination with any aspect of the invention.

The slot may be tapered such that opposing surfaces defining the thickness of the slot are at an angle to each other of at least 10°. The slot may be tapered such that opposing surfaces defining the thickness of the slot are at an angle to each other of at most 30°. For example, the opposing surfaces defining the thickness of the slot may be at an angle to each other of about 20°.

The opposing surfaces defining the thickness of the slot may be an outer surface of the wall of the flame-tube and a sloping surface of the boss. With such an arrangement, the flow through the slot can provide effective cooling of the flame-tube wall, helping to reduce a risk of TBC delamination.

The slot may be arranged such that the sheet-shaped flow, after passing across the tip, forms a cooling air film on the inside of the wall of the flame-tube on the opposite side of the tip to the slot.

The boss may be a two-part construction having an inner part proximate the tip and forming the slot, and an outer part holding a seal for the igniter plug. Such a construction allows the outer part of the boss to be removed and replaced as needed, while the inner part can remain welded to the wall of the flame-tube. In this way, TBC delamination associated with welding a single-piece boss to the flame-tube can be avoided. Conveniently, the inner and outer parts can be tack welded together.

The igniter boss can be welded to the flame-tube at opposing sides of the slot. As a result, the thermal mass of the boss can be reduced at the weld positions, which allows less heat energy to be used to form the welds, reducing a risk of TBC delamination.

The igniter boss can be shielded behind the wall of the flame-tube to protect it from the combusting air-fuel mixture within the flame-tube.

BRIEF DESCRIPTION OF THE DRAWINGS

Embodiments of the invention will now be described by way of example with reference to the accompanying drawings in which.

DETAILED DESCRIPTION OF EMBODIMENTS OF THE INVENTION

Figure 4:
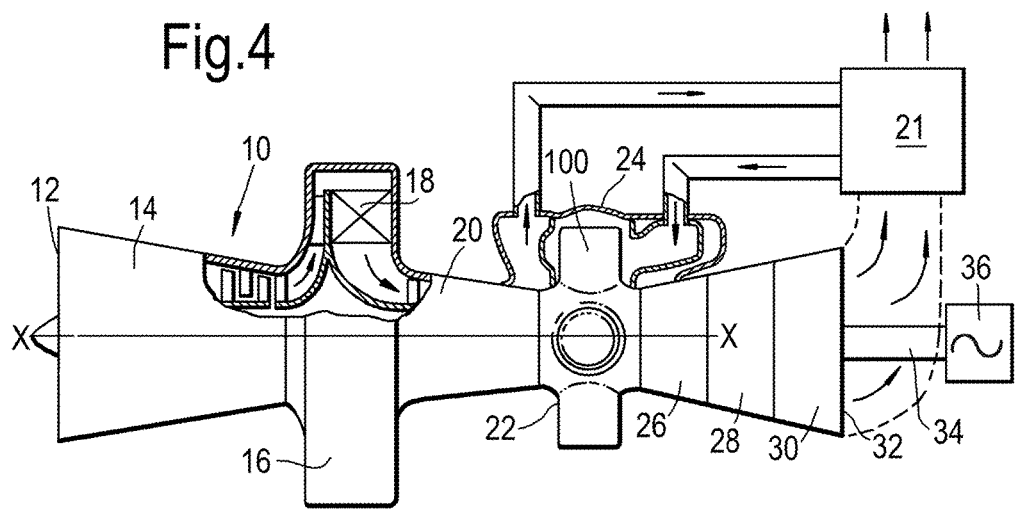
FIG. 4 shows a longitudinal cross-section through an advanced cycle gas turbine engine.

With reference to FIG. 4, an advanced cycle gas turbine engine incorporating the invention is generally indicated at 10 and has a principal and rotational axis X-X. The engine comprises, in flow series, an air inlet 12, a low-pressure compressor 14, an intercooler 16, a high-pressure compressor 20, a recuperator 21, a combustor 22, a high-pressure turbine 26, a low-pressure turbine 28, a power turbine 30 and an exhaust outlet 32.

During operation, air entering the intake 12 is compressed by the low-pressure compressor 14. It is then directed to the intercooler 16, where waste heat is removed in a heat exchanger 18. The compressed air flow is then delivered to the high-pressure compressor 20 where further compression takes place.

The compressed air exhausted from the high-pressure compressor 20 is directed into the recuperator 21 where the compressed air recovers heat from the exhaust gases leaving the exhaust outlet 32. The compressed air is then directed to the combustor 22, which includes a number of circumferentially spaced flame-tubes 100. A doubled-walled casing system 24 (only an upper portion of the casing system begin shown in FIG. 4) surrounds the flame-tubes and forms an outer volume for gathering the compressed air exhausted from the high-pressure compressor 20 en route to the recuperator 21, and an inner volume which receives the returning compressed air from the recuperator 21 for sharing between the flame-tubes.

In the flame-tubes 100, the compressed air is mixed with fuel and the mixture combusted. The resultant hot combustion products then expand through, and thereby drive, the high-pressure, low-pressure and power turbines 26, 28, 30 before being exhausted through the outlet 32.

The high and low-pressure turbines respectively drive the high and low-pressure compressors 20, 14 by suitable interconnecting shafts. The power turbine 30 turns a power shaft 34 which drives a load 36, such as an electricity generator or propeller, typically via a gearbox.

Figure 5:
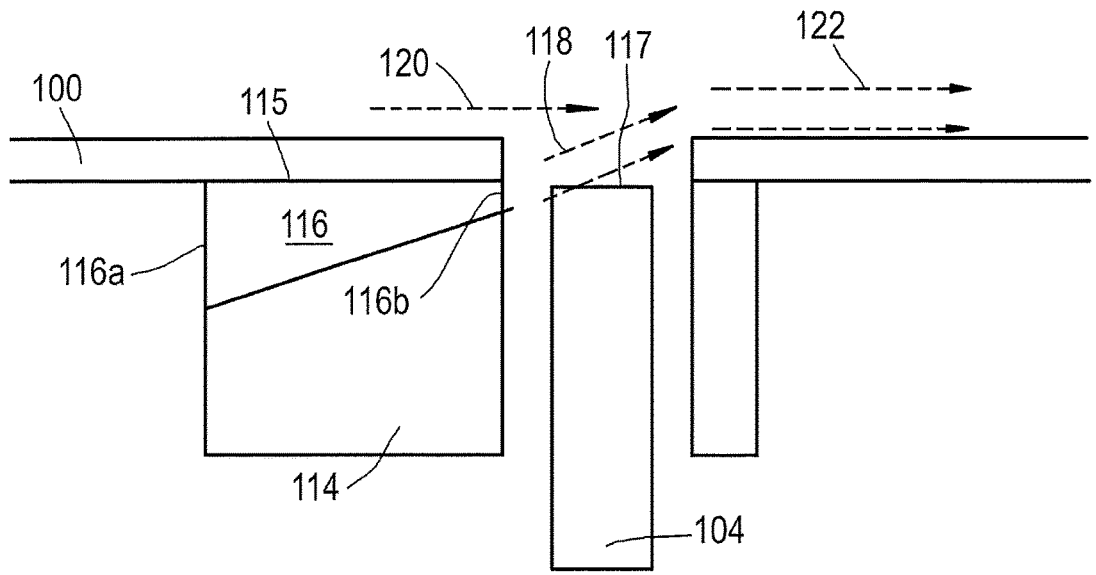
FIG. 5 shows schematically an igniter assembly for a flame-tube of the combustor of the engine of FIG. 4.

FIG. 5 shows schematically an igniter assembly for a flame-tube 100 of the combustor 22 of FIG. 4. The assembly comprises an igniter plug 104 and a substantially annular igniter boss 114. The igniter plug 104 enters its flame-tube 100 through an aperture in the wall of the tube, with the boss 114 welded to the tube at the aperture to encircle the tip of the plug. The wall of the flame-tube covers the inner surface 115 of the boss to protect the boss from corrosive fuels. The inner side of the wall of the flame-tube is in turn covered by a TBC.

Figure 1:
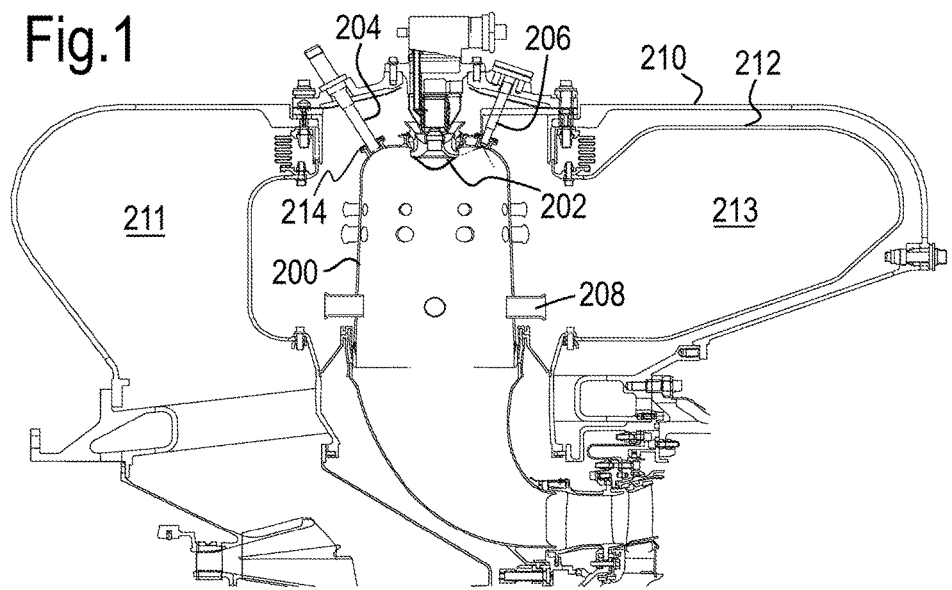
FIG. 1 shows schematically a cross-section through a multiple flame-tube combustor of a gas turbine engine.
Figure 2:
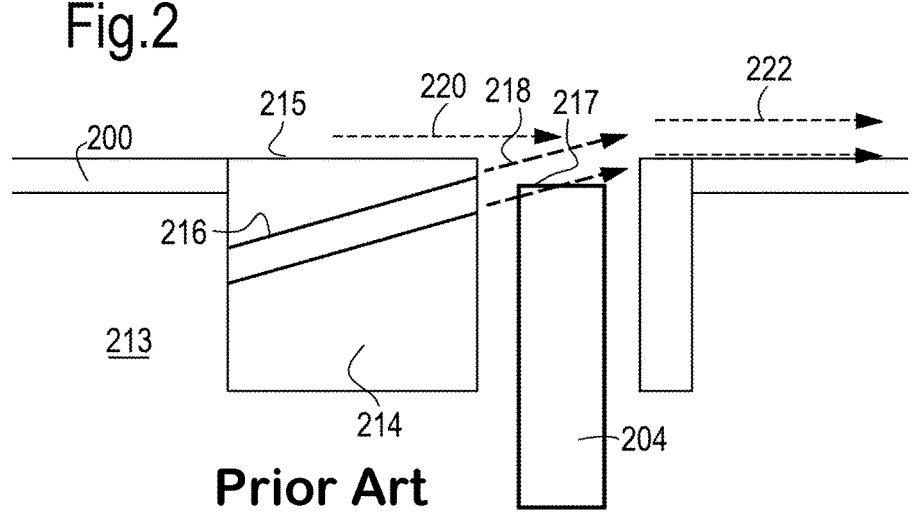
FIG. 2 shows schematically an igniter assembly for a flame-tube of the combustor of FIG. 1.

A tapered slot 116 with a rectangular flow cross-section is formed at one side of the boss 114 adjacent the wall of the flame-tube 100. The slot can be sized to pass the same amount of air flow as the three 3.0 mm diameter holes of FIG. 2. The taper is produced by reducing the thickness of the slot from its entrance 116a to its exit 116b. One side of the slot is bounded by the outer surface of the wall of the flame-tube 100 and the opposing side is bounded by a sloping surface of the boss, the angle between the two opposing surfaces being in the range from 10° to 30°, and preferably being about 20°. The slot produces a sheet-shaped flow 118 over the tip of the igniter plug 104 that scrubs the face 117 of the tip to remove large fuel droplets, and avoids impinging on the edge of the flame-tube wall. Further, the sheet-shaped flow 118 satisfactorily combines with upstream cooling air film 120, produced by angled effusion holes in the flame-tube wall, to create enhanced downstream cooling air film 122 across the hot side of the wall of the flame-tube.

Figure 6:
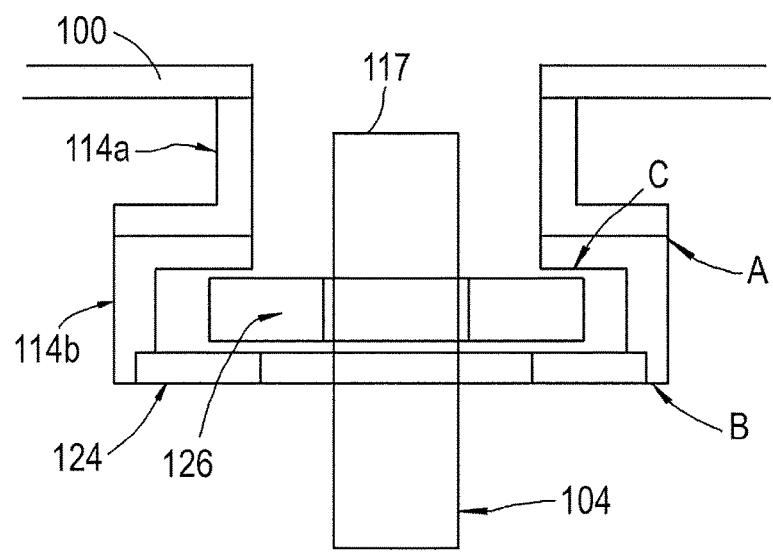
FIG. 6 shows a schematic cross-section through the igniter assembly of FIG. 5.

FIG. 6 shows a schematic cross-section through the igniter assembly (the cross-section avoiding the slot 116). The igniter boss 114 is formed in two parts, having an inner slot-forming part 114a, and an outer cap part 114b having a recess for a floating seal 126 for the igniter plug 104. The two parts are tack welded together at circumferentially spaced locations at position A. A retaining washer 124 is welded to the outer part 114b at position B to retain the floating seal 126.

Figure 7A:
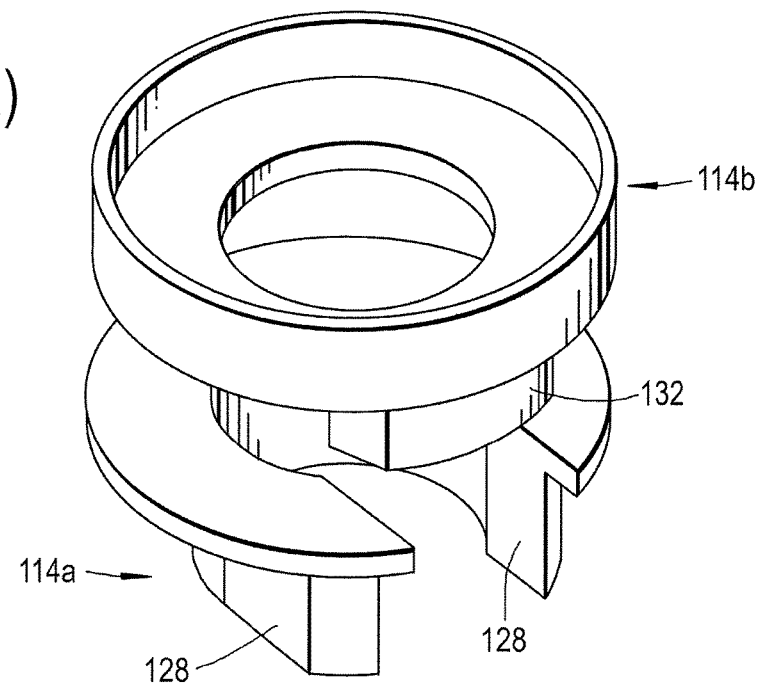
FIG. 7(a) shows a perspective view of two parts of an igniter boss of the assembly of FIGS. 4 and 5 before they are welded together.
Figure 7B:
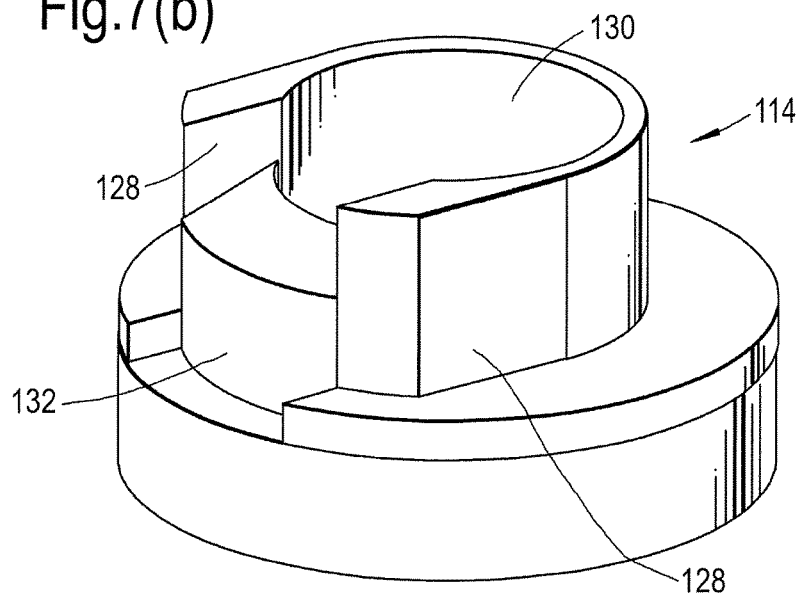
FIG. 7(b) shows a perspective view of two parts of an igniter boss of the assembly of FIGS. 4 and 5 after they are welded together.

FIG. 7 shows perspective views of the two parts of the boss 114(a) before and (b) after they are welded together. The width of the slot 116 is defined by the spacing between two facing walls 128 provided by the inner part 114a, a curved wall 130 joining the facing walls 128 together. The sloping surface which produces the tapering thickness of the slot is provided by a protrusion 132 from the outer part 114b, the protrusion inserting between the facing walls 128 when the two parts are assembled.

Welds between igniter bosses and flame-tubes can be susceptible to cracking, both during welding and in service, which can in turn compromise TBC adhesion (the TBC being applied to the inside of the flame-tube before the igniter boss is welded in place). TBC delamination during welding can cause a flame-tube to be scrapped, and TBC delamination in service can result in the full life of a flame-tube not being achieved.

Figure 3:
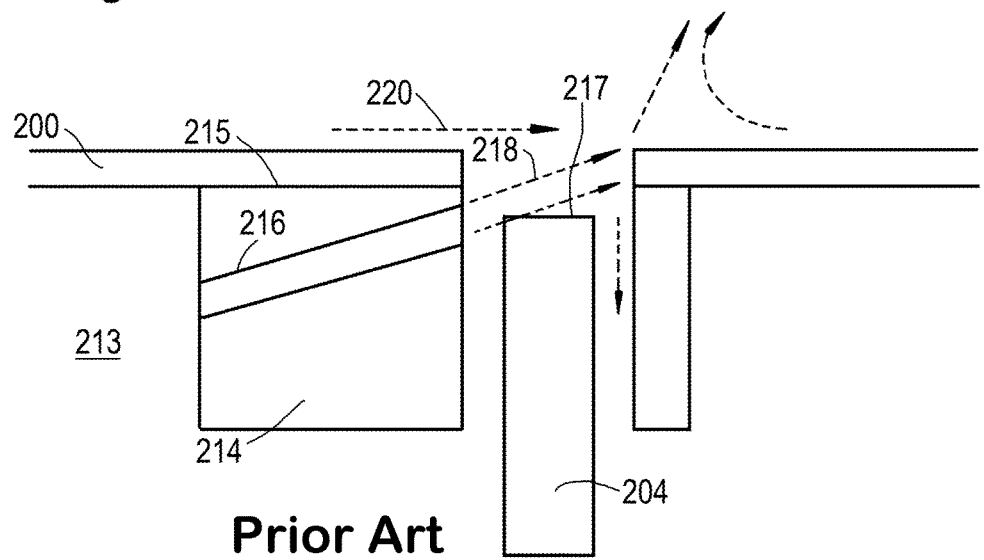
FIG. 3 shows schematically an adaptation to the igniter assembly of FIG. 2.

Conveniently the igniter boss 114 can be fillet welded to the wall of the flame-tube 100 along the lengths of the two facing walls 128. In this way, the slot 116 can reduce boss thermal mass in the vicinity of the welds compared with the thermal mass of a boss having cooling holes of the type discussed in relation to FIGS. 2 and 3. As a consequence less heat energy is needed to produce the welds, which reduces the likelihood of TBC delamination during welding. As to in service weld cracking, this is thought to be due to stresses created by differential thermal expansion between the igniter boss and the flame-tube; the boss being at compressed air delivery temperature, while the flame-tube is much hotter due to heat transfer from the combustion process. The slot 116 can create an extensive, high velocity airflow within the slot over the outer surface of the wall of the flame-tube 100, which can improve cooling of the wall to reduce the temperature of the flame-tube wall between the welds to the flame-tube. As a result, the temperature differential between the boss and the flame-tube wall between the welds can be reduced, decreasing stresses in the weld and reducing the likelihood of TBC delamination.

The facing walls 128 of the inner part 114a of the boss can be made as thin as possible to reduce thermal mass and increase wall flexibility to accommodate the (reduced) thermal expansion between the facing walls 128 and the flame-tube wall. The tack welds between the two parts of the boss 114 also allow the facing walls 128 to flex.

Typically, wear due to electrical discharge associated with the igniter plug occurs between the boss 114 and the floating seal 126, for example at position C indicated in FIG. 6. The boss may have to be replaced when the boss thickness becomes too thin risking detachment of the floating seal from the boss. With a one-part boss, such replacement risks TBC delamination during welding. However, advantageously, the two-part boss allows the outer part 114b of the boss to be removed and replaced while the inner part 114a remains welded in place to the wall of the flame-tube 100. For example, the removal can be effected by grinding away the local tack welds at position A. A new outer part 114b, retaining washer 124 and floating seal 126 can then be installed, the inner part 114a conveniently providing a centralising reference.

In summary, the igniter assembly addresses a number of issues that limit flame-tube life. These are:
- TBC delamination and metal cracking resulting from the welding of the igniter boss to the flame-tube wall,
- TBC delamination and metal cracking caused by flame-tube wall hotspots downstream of the igniter boss,
- Weld cracking between the igniter boss and the flame-tube wall, and
- Wear of the igniter boss wear adjacent the floating seal.

In addition, by effective scrubbing of the face of the tip of the igniter plug, the assembly can help to prevent fuel penetrating the assembly where it can cause coking and internal short circuits.

Furthermore, the preferred two-part construction for the igniter boss allows the outer part of the boss to be removed and replaced as needed, while the inner part remains welded to the wall of the flame-tube.

While the invention has been described in conjunction with the exemplary embodiments described above, many equivalent modifications and variations will be apparent to those skilled in the art when given this disclosure. For example, the igniter assembly can be applied to other types of combustor, e.g. with a single annular flame-tube such as is commonly used for aircraft propulsion. As another example, the slot need not be rectangular on its flow cross-section, but can be e.g. convex, concave or even wavy. The benefits of a given shape (such as enhanced igniter tip scrubbing, or more uniform air film downstream of the boss) can be established by component testing and/or computational fluid dynamics.

Accordingly, the exemplary embodiments of the invention set forth above are considered to be illustrative and not limiting. Various changes to the described embodiments may be made without departing from the scope of the invention as claimed.

The invention claimed is:

1. An igniter assembly for a combustion system of a gas turbine engine, the igniter assembly including:
   an igniter plug having a tip which, in use, is located at an aperture in a wall of a flame-tube of the combustion system such that the tip can provide an electrical discharge to ignite an air-fuel mixture within the flame-tube; and
   a substantially annular igniter boss which is located on the wall of the flame-tube at the aperture to encircle the tip, wherein
   the igniter boss has a slot formed therein at one side of the tip, an entrance of the slot receiving air from outside the flame-tube and an exit of the slot having a rectangular flow cross-section that delivers the air as a sheet-shaped flow over the tip, the slot being tapered such that a thickness of the slot narrows from an entrance of the slot to an exit of the slot, the thickness of the slot being defined by opposing surfaces, and the slot having a width in a circumferential direction of the boss,
   the opposing surfaces defining the thickness of the slot are an outer surface of the wall of the flame-tube and a sloping surface of the boss, and
   one side of the slot is bounded by the outer surface of the wall of the flame-tube, and a side of the slot opposing the one side of the slot is bounded by the sloping surface of the boss.

2. The igniter assembly according to claim 1, wherein the slot is tapered such that the opposing surfaces defining the thickness of the slot are at an angle to each other of at least 10°.

3. The igniter assembly according to claim 1, wherein the slot is tapered such that the opposing surfaces defining the thickness of the slot are at an angle to each other of at most 30°.

4. The igniter assembly according to claim 1, wherein the slot is arranged such that the sheet-shaped flow, after passing across the tip, forms a cooling air film on an inner surface of the wall of the flame-tube, the inner surface being a side of the flame-tube opposite to a side of the flame-tube facing the tip to the slot.

5. The igniter assembly according to claim 1, wherein the boss is a two-part construction having an inner part proximate the tip and forming the slot, and an outer part holding a seal for the igniter plug.

6. The igniter assembly according to claim 5, wherein the inner part and the outer part are tack welded together.

7. A combustion system of a gas turbine engine, the combustion system comprising:
the igniter assembly according to claim 1, the combustion system having one or more flame-tubes, and one or more igniter bosses.

8. The combustion system according to claim 7, wherein each of the one or more igniter bosses is welded to a respective flame-tube of the one or more flame-tubes at opposing sides of the slot of each of the one or more igniter bosses.

9. The combustion system according to claim 7, wherein an inner surface of the wall of each of the one or more flame-tubes has a thermal barrier coating, the inner surface of each of the one or more flame-tubes being a side opposite to a side of a respective flame-tube of the one or more flame-tubes facing a tip of the slot.

10. The combustion system according to claim 7, wherein each of the one or more igniter bosses is shielded behind the wall of each of the one or more flame-tubes to protect each of the one or more igniter bosses from a combusted air-fuel mixture within each of the one or more flame-tubes.

11. The combustion system according to claim 10, wherein each of the one or more igniter bosses is welded to a respective flame-tube of the one or more flame-tubes at opposing sides of the slot of each igniter boss the one or more igniter bosses.

12. The combustion system according to claim 11, wherein an inner surface of the wall of each of the one or more flame-tubes has a thermal barrier coating, the inner surface of each of the one or more flame-tubes being a side opposite to a side of a respective flame-tube of the one or more flame-tubes facing a tip of the slot.

13. A gas turbine engine comprising: the one or more flame-tubes; and the combustion system according to claim 7.

* * * * *